US007014221B2

(12) United States Patent
Iwasaki et al.

(10) Patent No.: US 7,014,221 B2
(45) Date of Patent: Mar. 21, 2006

(54) JOINT FOR PIPING

(75) Inventors: Kazuo Iwasaki, Mishima (JP); Takamitsu Kobayashi, Okazaki (JP); Yusushi Tsuchiya, Numazu (JP); Yoshinori Ishii, Okazaki (JP); Kazuya Suzuki, Okazaki (JP); Nagahisa Amano, Mishima (JP)

(73) Assignee: Usui Kokusai Sangyo Kaishi Limited, (JP)

( * ) Notice: Subject to any disclaimer, the term of this patent is extended or adjusted under 35 U.S.C. 154(b) by 0 days.

(21) Appl. No.: 10/745,052

(22) Filed: Dec. 22, 2003

(65) Prior Publication Data

US 2004/0183300 A1 Sep. 23, 2004

(30) Foreign Application Priority Data

Dec. 26, 2002 (JP) ............................ 2002-376526
Dec. 5, 2003 (JP) ............................ 2003-407594

(51) Int. Cl.
*F16L 39/00* (2006.01)
(52) U.S. Cl. ...................................... 285/319; 285/282
(58) Field of Classification Search ................ 285/319, 285/318, 317, 321, 282
See application file for complete search history.

(56) References Cited

U.S. PATENT DOCUMENTS 2,476,172 A * 7/1949 Williams .................... 285/280
2,819,914 A * 1/1958 Eitner ........................ 285/277
2,935,338 A * 5/1960 Mills, Jr. .................... 285/277
3,280,526 A * 10/1966 Pepitonc ..................... 285/317
4,139,222 A * 2/1979 Loland ...................... 285/316
4,730,856 A 3/1988 Washiza
4,776,616 A 10/1988 Umehara et al.
4,895,396 A 1/1990 Washizu
4,913,467 A 4/1990 Washizu
4,915,420 A 4/1990 Washizu
4,944,537 A 7/1990 Usui et al.
4,946,205 A 8/1990 Washizu
4,948,180 A 8/1990 Usui et al.
4,964,658 A 10/1990 Usui et al.
4,972,216 A 11/1990 Ueda et al.
5,048,875 A 9/1991 Usui et al.
5,090,748 A 2/1992 Usui et al.
5,094,481 A 3/1992 Takikawa et al.
5,098,136 A 3/1992 Washizu
5,112,084 A 5/1992 Washizu
5,114,250 A 5/1992 Usui
5,127,682 A 7/1992 Washizu
5,131,691 A 7/1992 Washizu
5,141,264 A 8/1992 Usui
5,154,450 A 10/1992 Washizu
5,154,451 A 10/1992 Washizu
5,160,177 A 11/1992 Washizu
5,163,719 A 11/1992 Washizu (Continued)

FOREIGN PATENT DOCUMENTS

JP 2278095 * 11/1990 ................. 285/319

(Continued)

*Primary Examiner*—David Bochna
(74) *Attorney, Agent, or Firm*—Gerald E. Hespos; Anthony J. Casella

(57) ABSTRACT

A joint for piping includes a pipe with an annular swelling wall and a connector body with a socket that includes locking pieces. The locking pieces hold the annular swelling wall when the pipe is inserted through the connector body to connector the pipe to the connector body. A projected member on the pipe fits in a recess on the connector body to prevent rotation between the pipe and the connector body.

15 Claims, 14 Drawing Sheets

U.S. PATENT DOCUMENTS

| | | | |
|---|---|---|---|
| 5,172,940 | A | 12/1992 | Usui et al. |
| 5,176,412 | A | 1/1993 | Washizu |
| 5,211,427 | A | 5/1993 | Washizu |
| 5,324,081 | A | 6/1994 | Umezawa |
| 5,328,216 | A | 7/1994 | Miyauchi et al. |
| 5,338,073 | A | 8/1994 | Washizu et al. |
| 5,354,106 | A | 10/1994 | Washizu et al. |
| 5,575,512 | A | 11/1996 | Umezawa |
| 5,580,100 | A | 12/1996 | Umezawa et al. |
| 5,890,749 | A | 4/1999 | Fukaya et al. |
| 6,412,830 | B1 | 7/2002 | Akiyama et al. |
| 6,595,558 | B1 | 7/2003 | Kusanagi |
| 6,682,106 | B1 * | 1/2004 | Parker ........................ 285/282 |

FOREIGN PATENT DOCUMENTS

| | | |
|---|---|---|
| JP | 7-269765 | 10/1995 |
| JP | 9-280451 | 10/1997 |
| JP | 2002-276878 | 9/2002 |

* cited by examiner

F I G. 1 a
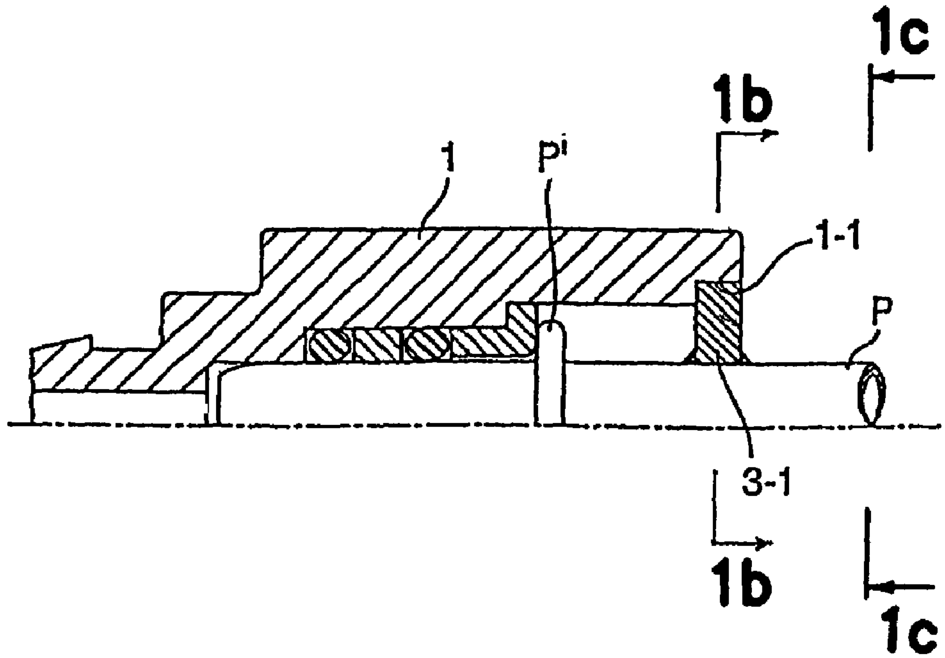
F I G. 1 b
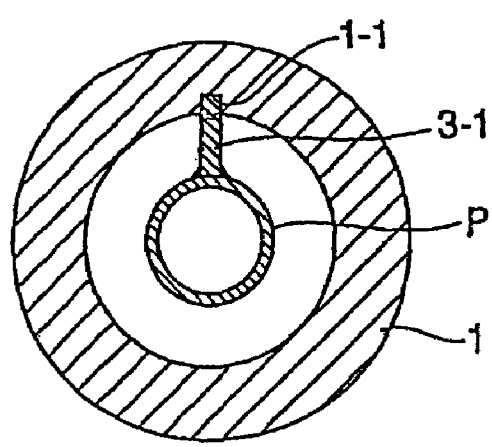

F I G. 4a
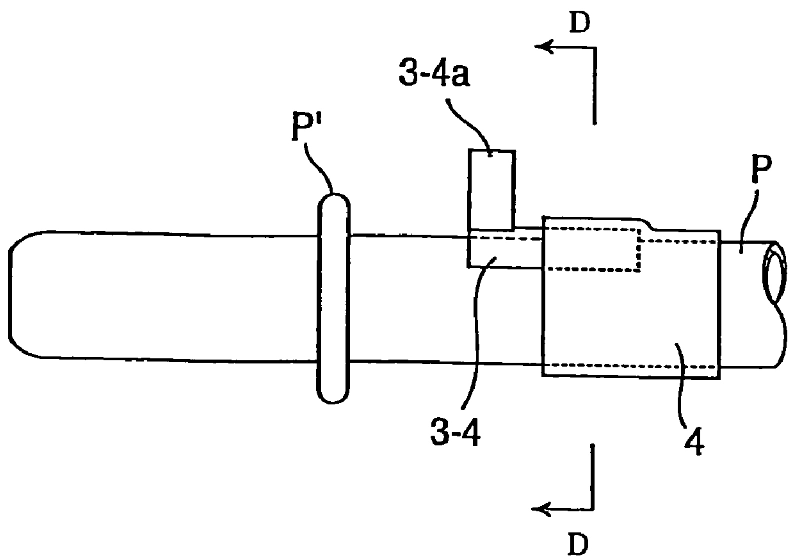
F I G. 4b
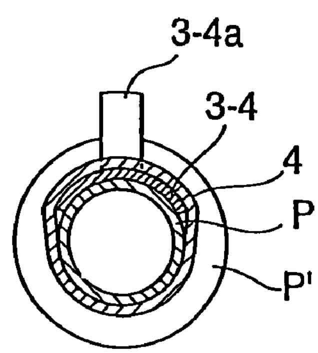

F I G. 7 a
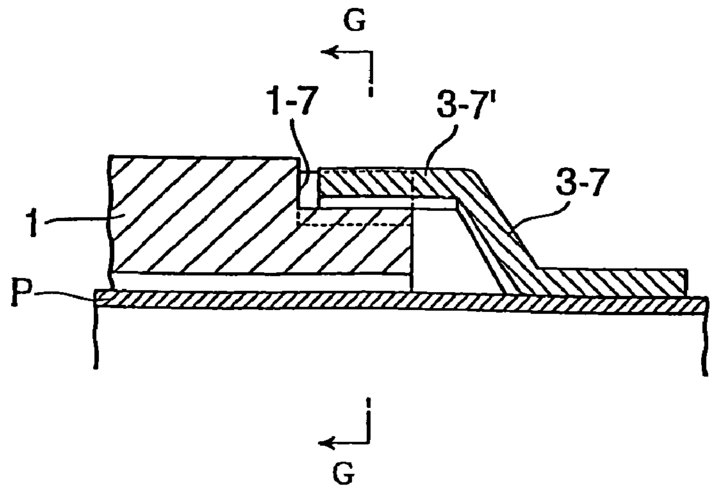
F I G. 7 b
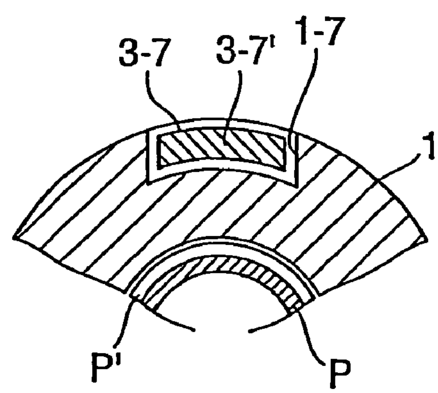

F I G. 1 3 PRIOR ART
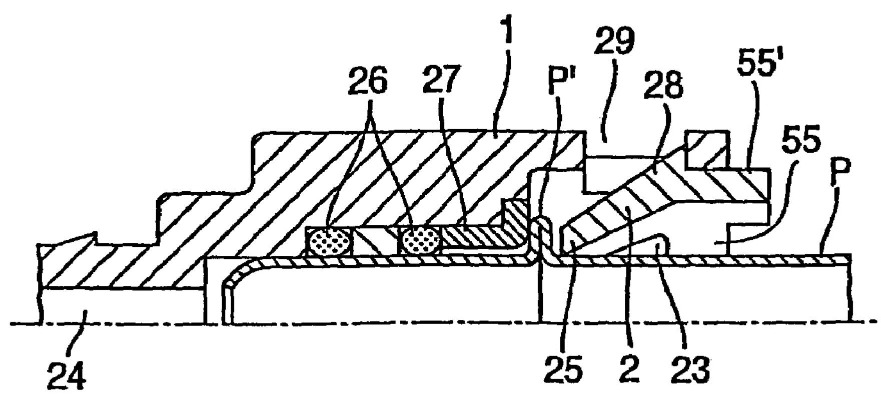
F I G. 1 4 PRIOR ART
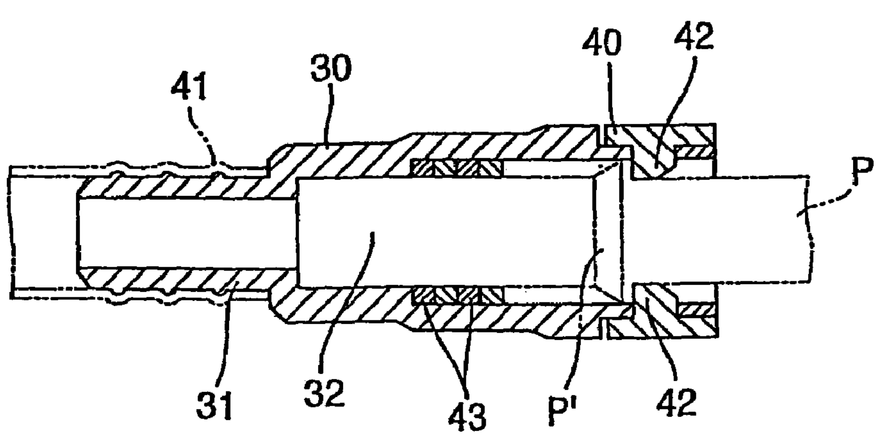

JOINT FOR PIPING

BACKGROUND OF THE INVENTION

1. Field of the Invention

The present invention relates to a joint for piping, and in particular, to a joint for piping which is used for piping for a resin tube, a metal tube, or the like, which has relatively small diameter and thickness, used as a supply pipe for refueling or air supply to various vehicles and machines.

2. Related Background Art

Conventionally, as this type of joint for piping, for example, there is known a joint for piping shown in FIG. 13 (see JP-A-9-280451). This joint for piping includes a pipe P, a connector body 1, and a socket body 2. A flow-through hole 24 is formed in an axial position in the connector body 1. An expanding diameter chamber 23 consisting of a small diameter chamber, in which sealing members 26 are contained, and a large diameter chamber communicating with the small diameter chamber is formed in an axial direction thereof in communication with this flow-through hole 24. Engagement holes 29 are provided in position opposed to each other on a peripheral surface thereof.

The socket body 2 includes an annular wall 55 and a projected wall 55' at an end thereof, and two engagement sections facing outward in a radial direction thereof and two locking pieces 25 facing inward in the radial direction, which are integrally formed extending in the axial direction from the annular wall 55. The socket body 2 is provided inside the connector body 1. In addition, the engagement sections 28 of the socket body 2 engages with the engagement holes 29 of the connector body 1, whereby the socket body 2 is held in a fixed position. Further, an annular swelling wall section (annular spool) P' is formed near one end of the pipe P.

When one end side of such a pipe P is inserted through the connector body 1, the locking pieces 25 are expanded by the annular swelling wall section P'. After the annular swelling wall section P' has passed, the locking pieces 25 return to an inner side in the radial direction, whereby the locking pieces 25 and an annular bush 27 hold the annular swelling wall section P' so as to be engageable, and the pipe P is connected to the connector body 1.

In the case of the joint for piping with such a constitution, when the pipe P is inserted through the connector body 1, the annular swelling wall section P' is held between the locking pieces 25 of the socket body 2 and the annular bush 27, whereby the joint for piping can be mounted to the connector body 1 easily with one touch of fingers.

In addition, there is known a connector including, as shown in FIG. 14, a body 30, which has a hose connecting section 31 at one end side and a pipe inserting section 32 at the other end side, and a clip 40, which clips a pipe body P inserted in a pipe body inserting section 32 onto a body 30 in association with a stopper protrusion P' thereof, in which a hose 41 and the pipe body P are connected in a communicating state, stop holes are pierced in clip fit sections on an external circumference of the pipe body inserting section 32, the clip 40 is formed with both ends thereof opposed to each other and in a ring shape biased in a reduced diameter state to be expanded to be mountable to the clit fit section, and locking pawls 42, which are inserted in the stop holes to lock the pipe body P in the pipe body inserting section 32, are provided on an internal circumferential surface of a ring shape (see JP-A-8-233181). Note that, in FIG. 14, reference numeral 43 denotes sealing members.

However, since the conventional joint for piping does not include rotation preventing means, which prevents rotation between the pipe and the connector body, between the pipe and the connector body, in particular, when it is used under a vibrated state, moving dislocation in a direction of the rotation may occur to cause abrasion of the sealing members and induce decrease in airtightness.

As a measure to cope with such a problem, for example, JP-A-7-269765 discloses a joint for piping which is provided with friction giving means between a pipe and a connector to prevent movement in a direction of rotation between the pipe and the connector. As this friction giving means, for example, a system for fitting a projection formed on an internal circumferential surface of a connector body in a slit provided at a tip of a pipe, or a system for disposing bushes for friction on an internal circumferential surface of a connector body and an external circumferential surface at a tip of a pipe is used.

In addition, JP-A-2002-276878 discloses a joint for piping which includes rotation preventing means which is provided with a holding section, with which a spool section of a male joint member engages to hold an end of the joint member so as not to come off, in a retainer and prevents rotation relative to a female joint member through cooperation of a pipe flat section of the male joint member and the holding section of the retainer.

However, the system for preventing movement in a direction of rotation between a pipe and a connector with a friction giving means provided between the pipe and the connector (see JP-A-7-269765) has disadvantages in that it is difficult to process a tip of a pipe end and the processing requires significant labor and time. In addition, the rotation preventing means for preventing relative rotation of a male joint member and a female joint member (see JP-A-2002-276878) has a disadvantage in that a space around a connector is required because a member is pushed from its side into the pipe flat section near the spool section inserted in the connector, and if the space is small, workability is low, in particular, if the connector is in a place where it is hard to be seen, confirmation of end of the work becomes uncertain. In addition, the rotation preventing means also has a disadvantage in that the pipe flat section has directionality in a circumferential direction, and if an angle thereof fluctuates, it may be difficult or impossible to insert the member. Further, it also has a disadvantage in that assembly thereof cannot be completed with one touch of fingers and takes time.

SUMMARY OF THE INVENTION

The present invention has been devised in order to eliminate such disadvantages, and it is an object of the present invention to provide a joint for piping which can not only completely prevent movement in a direction of rotation between a pipe and a connector even if it is used under a vibrated state but also perform work easily and promptly regardless of presence or absence of the above-mentioned space with a simple mechanism and a reduced number of assembly processes.

A joint for piping in accordance with the present invention is a joint for piping including: a pipe which is provided with an annular swelling wall section near an end thereof; and a connector body which is provided with sealing members, an annular bush, and a socket body including plural engagement sections facing outward in a radial direction and a plural locking pieces facing inward in the radial direction or a socket body having locking pawls on an internal circumferential surface thereof, the joint for piping holding, when the pipe is inserted through the connector body, the annular swelling wall section with the annular bush behind the sealing members and the locking pieces of the socket body, which is held by the engagement sections of the connector body, or the locking pawls of the socket body, which is fit into the connector body, and connecting the pipe to the connector body, which is characterized in that rotation preventing means, which prevents rotation between the pipe and the connector body, is provided between the pipe and the connector body, and the rotation preventing means includes at least one recessed portion or cutout recessed portion, which is formed in a part on an internal circumferential surface or a circumference at an end of the connector body through which an external circumferential surface of the pipe is inserted, and at least one projected member, which is provided in the vicinity of the opposite side of a pipe tip side of the annular swelling section of the pipe, and is of a system for fitting the projected member into the recessed portion.

In addition, a joint for piping in accordance with the present invention is a joint for piping including: a pipe provided with an annular swelling wall section near an end thereof; and a connector body which is provided with sealing members and a socket body including plural engagement section facing outward in a radial direction and plural locking pieces facing inward in the radial direction, the joint for piping holding, when the pipe is inserted through the connector body, the annular swelling wall section with the annular bush behind the sealing members and the locking pieces of the socket body, which is held by the engagement sections of the connector body, and connecting the pipe to the connector body, which is characterized in that rotation preventing means of a system for engaging at least one projection, which is provided in the vicinity of an opposite side of a pipe tip side of the annular swelling wall section of the pipe, with the locking pieces or pawls provided in the socket body.

Further, the recessed portion or the cutout recessed portion in the rotation preventing means of the present invention is provided in a circumferential direction on an internal circumferential surface or an external circumferential surface at a rear end of the connector body, is constituted by a hole or a hole-like recessed portion provided at a rear end surface of the connector body, and has a flat surface provided on the external circumferential surface at the rear end of the connector body.

The projected member in the rotation preventing means of the present invention is integral with or separate from the pipe, and the separate projected member is provided on the external circumferential surface of the pipe using one of jointing means such as brazing, welding, adhesion, and calking.

In addition, the separate projected member can be formed of a plate-like member or a bar-like member adhered to the external circumferential surface of the pipe, can be formed by projecting a part of an annular body, which is fit and fixed in the outside of the pipe, in the radial direction, or can be provided by fixing a die with a projection to the pipe using a heat-shrinkable tube.

Further, the separate projected member to be engaged with locking means provided in the socket body can also be constituted by forming the locking means on a side of the annular body which is fit and fixed in the outside of the pipe.

Moreover, the present invention can also adopt a system for forming the separate projected member by projecting it in the radial direction in a part of the annular body, which is fit and fixed in the outside of the pipe, and fixing it by pressing the annular body with a projection in a rectangular spool formed in the pipe.

As described above, according to the present invention, a highly reliable joint for piping can be obtained which can completely prevent movement in a direction of rotation between the pipe and the connector body with the rotation preventing means provided between the pipe and the connector body and in which airtightness is never decreased by abrasion due to movement of the sealing members relative to the pipe even if the joint for piping is used in an environment in which vibrations occur often. In addition, the present invention realizes excellent advantages that the joint for piping is simple in mechanism and has a reduced number of assembly processes, and work can be performed easily and promptly regardless of presence or absence of a space in a place where it is used.

BRIEF DESCRIPTION OF THE DRAWINGS

In the accompanying drawings:

FIG. 4A is a side view of a main part showing a fourth embodiment of the present invention;

FIG. 4B is a longitudinal sectional view on line D—D in FIG. 4A;

FIG. 7A is a longitudinal sectional side view of a main part showing a seventh embodiment of the present invention;

FIG. 7B is a longitudinal sectional view on line G—G in FIG. 7A;

FIG. 13 is a half longitudinal sectional side view showing an example of a conventional joint for piping; and FIG. 14 is a longitudinal sectional side view showing another example of the conventional joint for piping.

DESCRIPTION OF THE PREFERRED EMBODIMENT

Figure 1C:
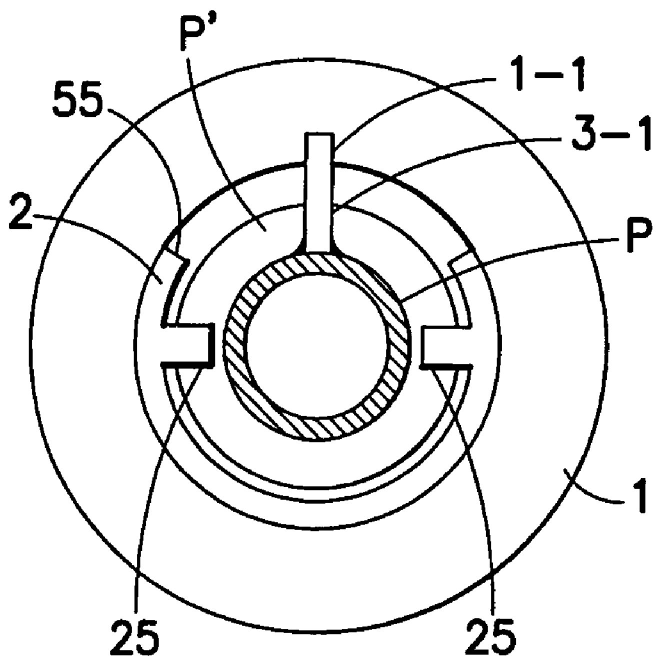
FIG. 1A is a half longitudinal sectional side view showing a first embodiment of a joint for piping in accordance with the present invention.
FIG. 1B is a longitudinal sectional view on line A—A in FIG. 1A.

In FIGS. 1A to 12C, a joint for piping in accordance with the present invention is provided with structure for preventing a pipe P from separating axially from a connector body 1 similar to the conventional structure for this purpose as shown in FIGS. 13 and 14. However, the joint for piping in accordance with the invention also is provided with rotation preventing means between an external circumferential surface of a pipe P and a connector body 1 on an opposite side (rear end side) of a pipe tip side of an annular swelling wall section P' of the pipe P. In a first embodiment shown in FIGS. 1A and 1B, a recessed portion 1-1 with an appropriate depth is formed on an internal circumferential surface at an end of the connector body 1 through which the external circumferential surface of the pipe P is inserted, a projected member 3-1, which fits in this recessed portion 1-1, is adhered to the external circumferential surface of the pipe P by joining means such as brazing, welding, or adhesion, and in a state in which the connector body 1 is assembled with the pipe P, the projected member 3-1 adhered to the external circumferential surface of the pipe P is fit in the recessed portion 1-1 provided on the connector body 1 side, whereby mutual movement in a direction of rotation between the pipe P and the connector body 1 is prevented.

Figure 2A:
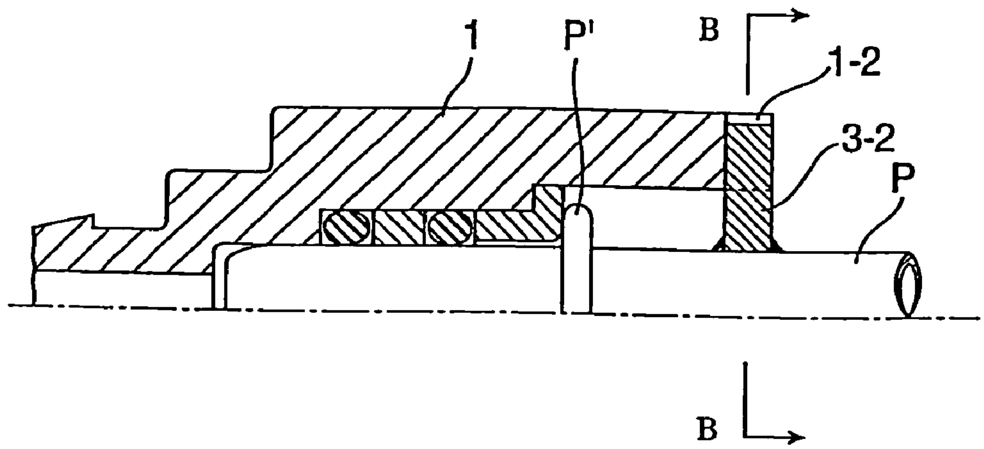
FIG. 2A is a half longitudinal sectional side view showing a second embodiment of the present invention.
Figure 2B:
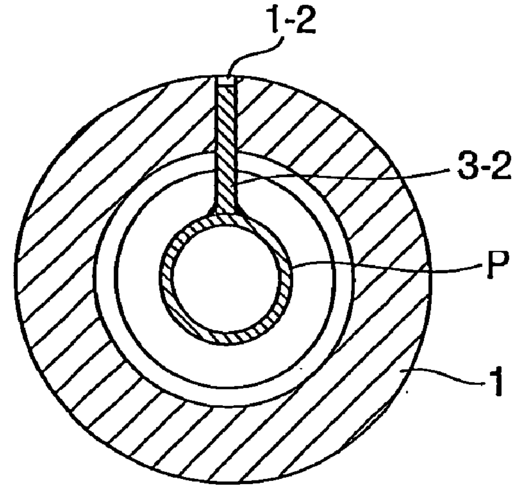
FIG. 2B is a longitudinal sectional view on line B—B in FIG. 2A.

A second embodiment shown in FIGS. 2A and 2B has the same structure as the first embodiment except that a cutout recessed portion 1-2 is provided instead of the recessed portion 1-1. In other words, the cutout recessed portion 1-2 is formed on a circumference at the end of the connector body 1, a projected member 3-2, which fits in this cutout recessed portion 1-2, is adhered to the external circumferential surface of the pipe P by joining means such as brazing, welding, or adhesion, and in a state in which the connector body 1 is assembled with the pipe P, the projected member 3-2 adhered to the external circumferential surface of the pipe P is fit in the recessed portion 1-2 provided on the connector body 1 side, where by mutual movement in a direction of rotation between the pipe P and the connector body 1 is prevented.

Figure 3A:
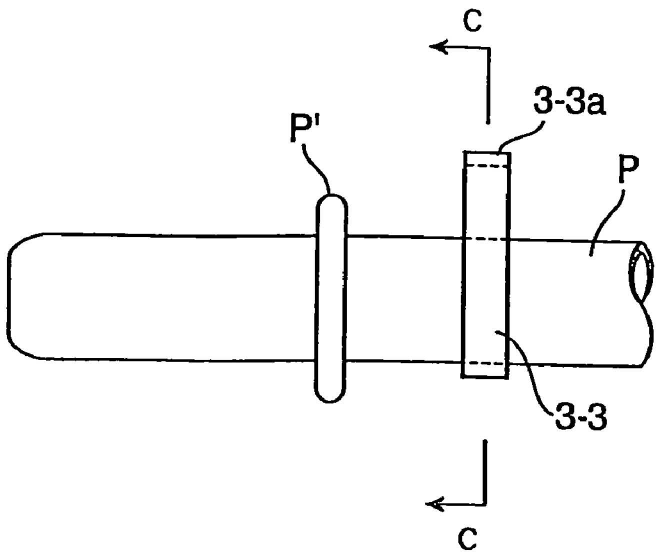
FIG. 3A is a side view of a main part showing a third embodiment of the present invention.
Figure 3B:
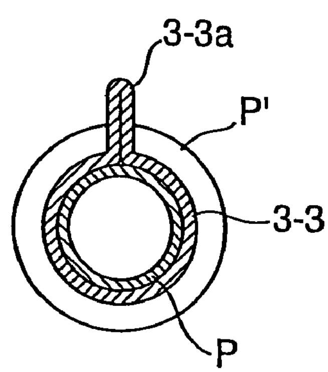
FIG. 3B is a longitudinal sectional view on line C—C in FIG. 3A.
Figure 5A:
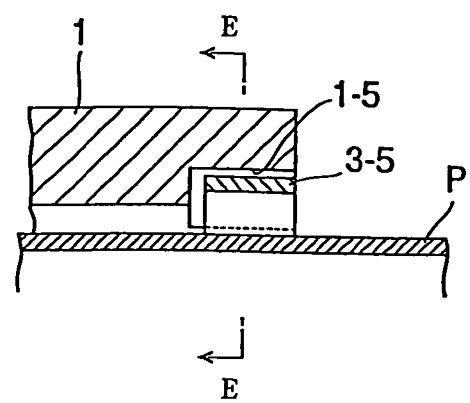
FIG. 5A is a longitudinal sectional side view of a main part showing a fifth embodiment of the present invention.
Figure 5B:
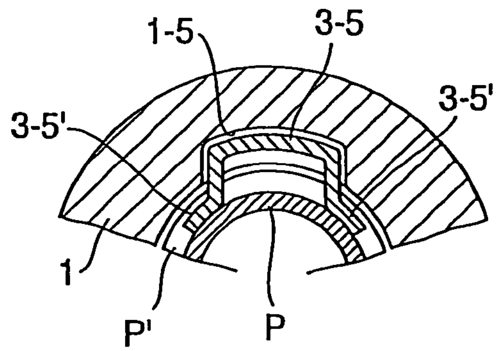
FIG. 5B is a longitudinal sectional view on line E—E in FIG. 5A.

Next, a third embodiment shown in FIGS. 3A and 3B has the same structure as the first and second embodiments except that a projected member, which fits in the recessed portion 1-1 or the cutout recessed portion 1-2 formed at the end of the connector body 1, is formed of an annular body. As a structure of the projected member, a projection 3-3*a* is formed on a circumference of an annular body 3-3 having a width which can fit in the recessed portion 1-1 or the cutout recessed portion 1-2 formed at the end of the connector body 1. This annular body 3-3 is also adhered to the external circumferential surface of the pipe P by joining means such as brazing, welding, or adhesion as in the first and second embodiments. As a method of manufacturing this annular body 3-3 with the projection, it is possible to use a method of preparing an annular body having a diameter larger than an outside diameter of the pipe P and pressing a part of this annular body with a machine tool or the like to form the projection 3-3*a*.

A fourth embodiment shown in FIGS. 4A and 4B has the same structure as the first to third embodiments except that the projected member, which fits in the recessed portion 1-1 or the cutout recessed portion 1-2 formed at the end of the connector body 1, is formed of a die with a projection. Means for providing the projected member is a system for fixing a die 3-4 with a projection 3-4*a* to the external circumferential surface of the pipe P using a heat-shrinkable tube 4.

Embodiments shown in FIGS. 5A to 6B illustrate a system for fitting a projected member separate from the pipe P, which is provided in the circumferential direction on the external circumferential surface of the pipe P, in a recessed portion provided on the internal circumferential surface at the rear end of the connector body 1. In a fifth embodiment shown in FIGS. 5A and 5B, at least one arcuate recessed portion 1-5 in the circumferential direction is formed on the internal circumferential surface at the rear end of the connector body 1, a projected member 3-5 in the circumferential direction, which fits in this arcuate recessed portion 1-5, is adhered to the external circumferential surface of the pipe P by joining means such as brazing, welding, or adhesion, and in a state in which the connector body 1 is assembled with the pipe P, the projected member 3-5 adhered to the external circumferential surface of the pipe P is fit in the arcuate recessed portion 1-5 provided on the connector body 1 side, whereby mutual movement in a direction of rotation between the pipe P and the connector body 1 is prevented. In the projected member 3-5 described here, a thin plate member is formed in a protruded shape along an internal circumferential surface of the arcuate recessed portion 1-5, and collar sections 3-5' at both ends thereof are adhered to the external circumferential surface of the pipe p by joining means such as brazing, welding, or adhesion such that a protruded shaped portion thereof fits in the arcuate recessed portion 1-5 provided on the connector body 1 side.

Figure 6A:
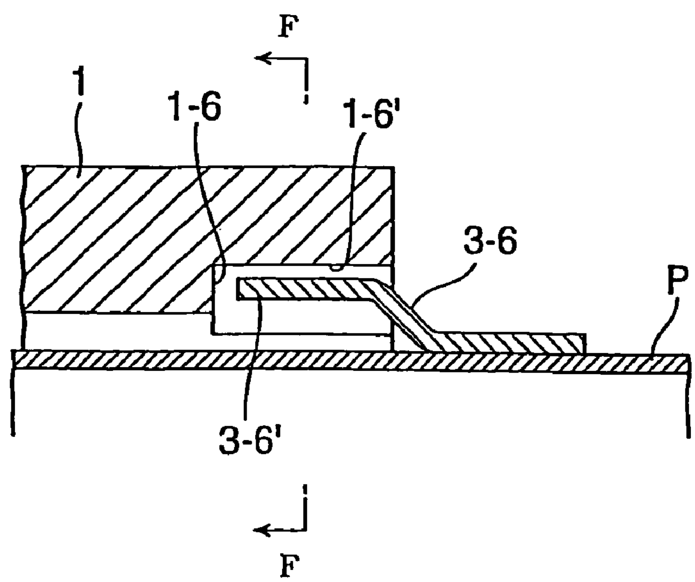
FIG. 6A is a longitudinal sectional side view of a main part showing a sixth embodiment of the present invention.
Figure 6B:
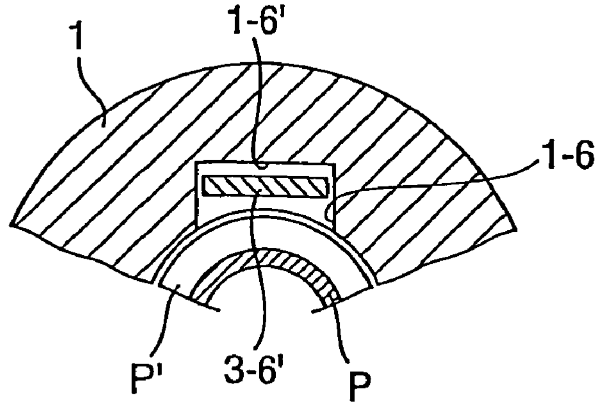
FIG. 6B is a longitudinal sectional view on line F—F in FIG. 6A.

In a sixth embodiment shown in FIGS. 6A and 6B, a recessed portion 1-6 in the circumferential direction having a flat surface 1-6' is formed on the internal circumferential surface at the rear end of the connector body 1, a projected member 3-6 in the circumferential direction having a flat portion 3-6', which fits in this recessed portion 1-6, is adhered to the external circumferential surface of the pipe P by joining means such as brazing, welding, or adhesion, and in a state in which the connector body 1 is assembled with the pipe P, the flat portion 3-6' of the projected member 3-6 adhered to the external circumferential surface of the pipe P is fit in the recessed portion 1-6 having the flat surface 1-6' provided on the connector body 1 side, whereby mutual movement in a direction of rotation between the pipe P and the connector body 1 is prevented. In the projected member 3-6 described here, a thin plate member is formed in substantially a crank shape, and a rear end thereof is adhered to the external circumferential surface of the pipe P by joining means such as brazing, welding, or adhesion such that the flat portion 3-6' at a tip portion thereof fits in the recessed portion 1-6 provided on the connector body 1 side.

Embodiments shown in FIGS. 7A to 9B illustrate a system for fitting a projected member separate from the pipe P, which is provided on the external circumferential surface of the pipe P, in a recessed portion provided on the external circumferential surface at the rear end of the connector body 1. In a seventh embodiment shown in FIGS. 7A and 7B, an arcuate recessed portion 1-7 is formed in the circumferential direction on the external circumferential surface at the rear end of the connector body 1, a projected member 3-7 in the circumferential direction, which fits in this arcuate recessed portion 1-7, is adhered to the external circumferential surface of the pipe P by joining means such as brazing, welding, or adhesion, and in a state in which the connector body 1 is assembled with the pipe P, the projected member 3-7 adhered to the external circumferential surface of the pipe P is fit in the arcuate recessed portion 1-7 provided on the connector body 1 side, whereby mutual movement in a direction of rotation between the pipe P and the connector body 1 is prevented. As in the sixth embodiment, in the projected member 3-7 described here, a thin plate member is formed in substantially a crank shape, and a rear end thereof is adhered to the external circumferential surface of the pipe P by joining means such as brazing, welding, or adhesion such that an arcuate portion 3-7' at a tip portion thereof fits in the recessed portion 1-7 provided on the connector body 1 side.

Figure 8A:
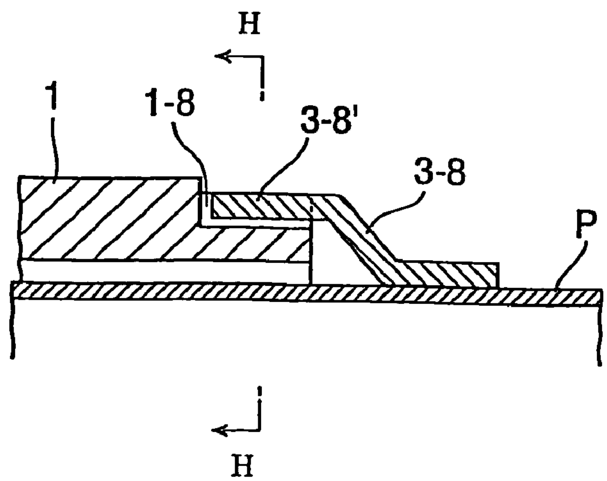
FIG. 8A is a longitudinal sectional side view of a main part showing an eighth embodiment of the present invention.
Figure 8B:
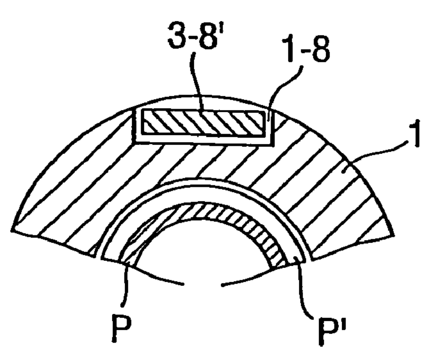
FIG. 8B is a longitudinal sectional view on line H—H in FIG. 8A.

In an eighth embodiment shown in FIGS. 8A and 8B, a recessed portion 1-8 in the circumferential direction having a flat surface 1-8' is formed on the external circumferential surface at the rear end of the connector body 1, a projected member 3-8 in the circumferential direction having a flat portion 3-8', which fits in this recessed portion 1-8, is adhered to the external circumferential surface of the pipe P by joining means such as brazing, welding, or adhesion, and in a state in which the connector body 1 is assembled with the pipe P, the flat portion 3-8' of the projected member 3-8 adhered to the external circumferential surface of the pipe P is fit in the recessed portion 1-8 having the flat surface 1-8' provided on the connector body 1 side, whereby mutual movement in a direction of rotation between the pipe P and the connector body 1 is prevented. As in the sixth and seventh embodiments, in the projected member 3-8 described here, a thin plate member is formed in substantially a crank shape, and a rear end thereof is adhered to the external circumferential surface of the pipe P by joining means such as brazing, welding, or adhesion such that the flat portion 3-8' at a tip portion thereof fits in the recessed portion 1-8 provided on the connector body 1 side.

Figure 9A:
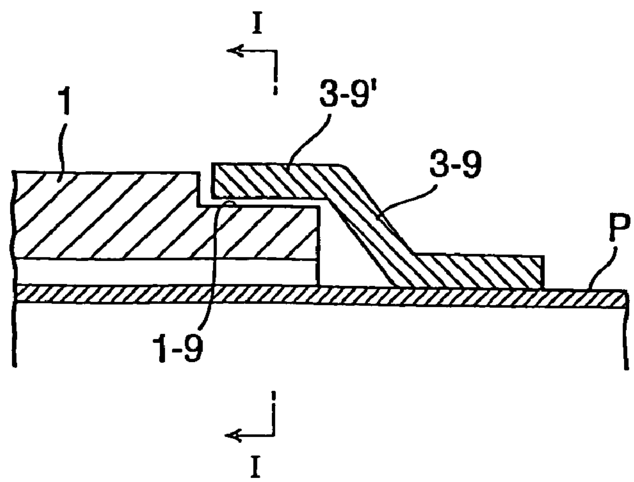
FIG. 9A is a longitudinal sectional side view of a main part showing a ninth embodiment of the present invention.
Figure 9B:
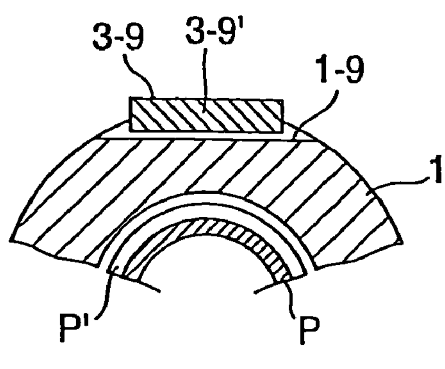
FIG. 9B is a longitudinal sectional view on line I—I in FIG. 9A.

In a ninth embodiment shown in FIGS. 9A and 9B, a flat surface 1-9 is formed on the external circumferential surface at the rear end of the connector body 1, a projected member 3-9 having a flat portion 3-9', which overlaps the flat surface 1-9, is adhered to the external circumferential surface of the pipe P by joint means such as brazing, welding, or adhesion, and in a state in which the connector body 1 is assembled with the pipe P. the flat portion 3-9' of the projected member 3-9 adhered to the external circumferential surface of the pipe P is laid over the flat surface 1-9 provided on the connector body 1 side, whereby mutual movement in a direction of rotation between the pipe P and the connector body 1 is prevented. As in the sixth, seventh, and eighth embodiments, in the projected member 3-9 described here, a thin plate member is formed in substantially a crank shape, and a rear end thereof is adhered to the external circumferential surface of the pipe P by joining means such as brazing, welding, or adhesion such that the flat portion 3-9' at a tip portion thereof overlaps the flat surface 1-9 on the connector body 1 side.

Figure 10A:
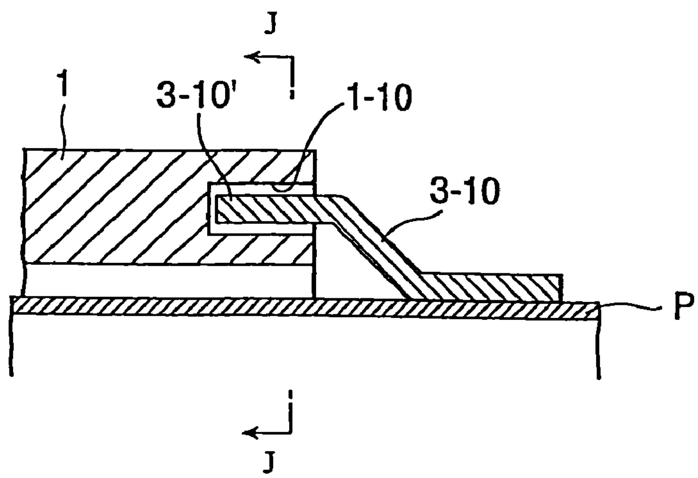
FIG. 10A is a longitudinal sectional side view of a main part showing a tenth embodiment of the present invention.
Figure 10B:
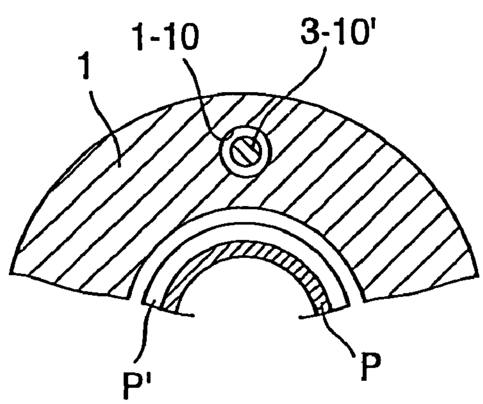
FIG. 10B is a longitudinal sectional view on line J—J in FIG. 10A.

A tenth embodiment shown in FIGS. 10A and 10B illustrates a system for fitting at least one projected member separate from the pipe, which is provided on the external circumferential surface of the pipe, into at least one hole provided on the rear end surface of the connector body. A hole 1-10 with a desired depth is formed in a pipe axial direction on the rear end surface of the connector body 1, a bar-like projected member 3-10 having a straight portion 1-10', which fits into this hole 1-10, is adhered to the external circumferential surface of the pipe P by joining means such as brazing, welding, or adhesion, and in a state in which the connector body 1 is assembled with the pipe P, the straight portion 3-10' of the projected member 3-10 adhered to the external circumferential surface of the pipe P is fit into the hole 1-10 provided on the connector body 1 side, whereby mutual movement in a direction of rotation between the pipe P and the connector body 1 is prevented. The projected member 3-10 described here consists of a round bar, and a rear end thereof is adhered to the external circumferential surface of the pipe P by joining means such as brazing, welding, or adhesion such that the straight portion 3-10' at a tip end thereof fits into the hole 1-10 on the connector body 1 side.

Figure 11A:
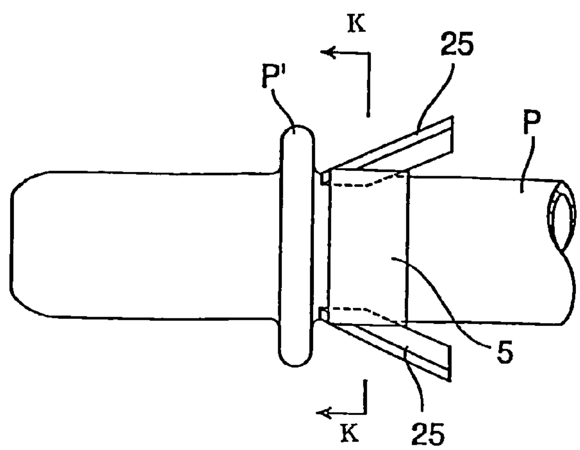
FIG. 11A is a side view of a main part showing an eleventh embodiment of the present invention.
Figure 11B:
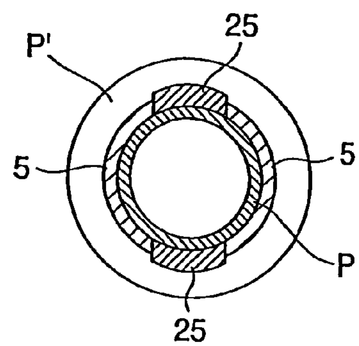
FIG. 11B is a longitudinal sectional view on line K—K in FIG. 11A.

In an eleventh embodiment shown in FIGS. 11A and 11B, rotation preventing means for preventing rotation between the pipe P and the connector body 1 is constituted using two locking pieces 25 facing inward of a socket body 2 which is mounted inside the connector body 1 of the joint for piping shown in FIG. 13. In a mechanism shown in FIGS. 11A and 11B, two rotation stop members 5 are adhered to the external circumferential surface of the pipe P by joining means such as brazing, welding, or adhesion in the vicinity of the annular swelling wall section P' formed in the pipe P so as to nip two locking pieces (pawls) 25 facing inward of the socket body 2, and sides of the two locking pieces (pawls) 25 of the socket body 2 come into abutment against the two rotation stop members 5, whereby rotation between the pipe P and the connector body 1 is prevented. The rotation stop members 5 are formed in an arcuate shape so as to be formed along the external circumferential surface of the pipe P.

Figure 11C:
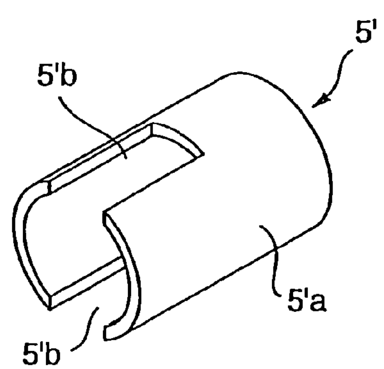
FIG. 11C is a perspective view showing another embodiment of a rotation stop member of the eleventh embodiment.

In addition, a rotation stop member 5' shown in FIG. 11C is illustrated as a rotation stop member of an integral structure instead of the two rotation stop members 5. The rotation stop member 5' has a structure in which recessed grooves 5'*b*, in which the two locking pieces (pawls) 25 facing inward of the socket body 2 fit, is formed on a side wall of a cylindrical body 5'*a*. In other words, in the case of this rotation stop member 5', the rotation stop member 5' is externally fit in the pipe P and is adhered there to by joining means such as brazing, welding, or adhesion, and the two locking pieces (pawls) 25 of the socket body 2 fit in the recessed grooves 5'*b* to come into abutment against the inner surfaces of recessed grooves, whereby rotation between the pipe P and the connector body 1 is prevented.

Figure 12A:
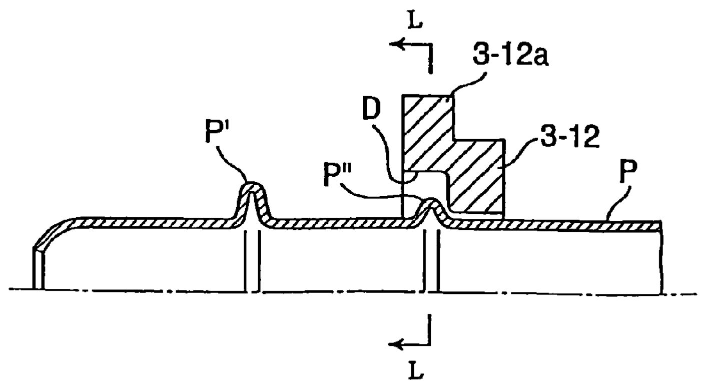
FIG. 12A is a longitudinal sectional side view of a main part showing a twelfth embodiment of the present invention.
Figure 12B:
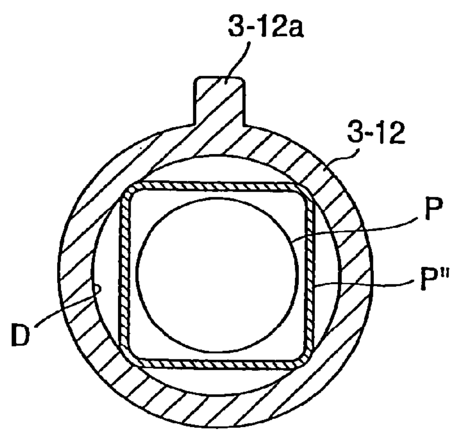
FIG. 12B is a longitudinal sectional view on line L—L in FIG. 12A.

In a twelfth embodiment shown in FIGS. 12A and 12B, for example, a projected member, which fits in the recessed portion 1-1 or the cutout recessed portion 1-2 formed at the end of the connector body 1 shown in FIGS. 1A and 1B or FIGS. 2A and 2B, is formed as an annular body, and means for pressing the annular body in a rectangular spool P" with a rectangular shape in cross section, which is formed separately from the annular swelling wall section P' formed in the pipe P, is adopted as fixing means for the annular body. More specifically, the rectangular spool P" is formed inside the annular swelling wall section P' formed in the pipe P, and an annular body 3-12 with a projection 3-12_a_, which has an expanding diameter section D with an inside diameter slightly smaller than a length of a diagonal line (diameter) of the rectangular spool P", is pressed in the rectangular spool P" and fixed therein.

Figure 12C:
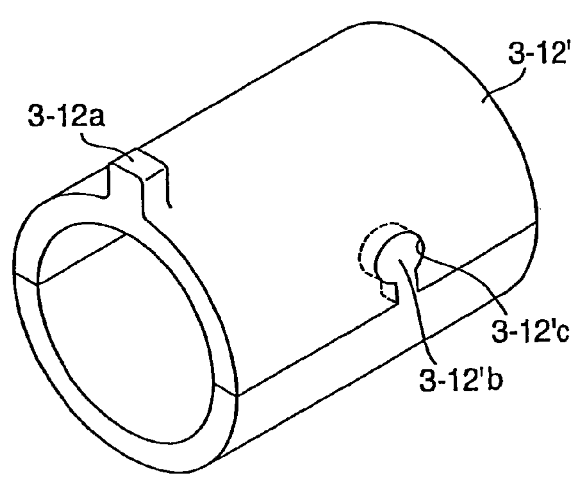
FIG. 12C is a perspective view showing another embodiment of a rotation stop member of the twelfth-embodiment.

In addition, as shown in FIG. 12C, it is also possible that the annular body 3-12 with the projection 3-12*a* is formed with a structure in which the body is divided into two, and is assembled by fitting a protruded portion 3-12'*b* provided on one joining surface in a recessed portion 3-12' formed on the other joining surface. In this case, a fitting mechanism may be provided over the entire joining surface or a part of the joining surface in the pipe axial direction.

Note that, here, the present invention has been described with the case in which the present invention is applied to the joint for piping shown in FIG. 13 as an example. However, it is needless to mention that the rotation preventing means according to the fitting system and the rotation preventing means according to the rotation stop system using the locking pieces, the locking pawls, or the like provided in the connector body are also applicable to a connector body shown in FIG. 14 and various connector bodies having the same structure.

The presenting invention is also applicable to, in particular, a connector which is used for various kinds of piping for a resin tube, a metal tube, or the like, which has relatively small diameter and thickness, used as a supply pipe for refueling or air supply to various vehicles and machines.

What is claimed is:

1. A joint for piping comprising:

a pipe with an annular swelling wall near an end thereof; and at least one sealing member on the pipe between the end and the annular swelling wall, an annular bush between the sealing member and the annular swelling wall, a connector body having a rear end and a circumferential wall extending forward from the rear end and defining a chamber extending into the rear end of the connector body, the chamber being dimensioned for receiving portions of the pipe, the sealing member and the annular bush, and a socket body including engagement means for engaging the circumferential wall of the connector body and locking means facing inward for engaging a side of the annular swelling wall opposite the annular bush, wherein rotation preventing means is provided between the pipe and the connector body for preventing rotation between the pipe and the connector body, the rotation preventing means includes at least one recessed portion extending forwardly in the circumferential wall from the rear end of the connector body to a closed front end, and at least one projected member projecting from the pipe at the side of the annular swelling wall, the projected member being disposed and dimensioned for fitting the projected member linearly into the recessed portion and for preventing relative rotation between the pipe and the connector body.

2. The joint for piping according to claim 1, wherein the recessed portion is provided in a circumferential direction on an internal circumferential surface or an external circumferential surface at the rear end of the connector body.

3. The joint for piping according to claim 1, wherein the recessed portion is a hole extending substantially linearly into the rear end of the connector body and spaced from the inner and outer circumferential surfaces of the circumferential wall.

4. The joint for piping according to claim 1, wherein the recessed portion has a flat surface provided on an external circumferential surface at the rear end of the connector body.

5. The joint for piping according to claim 1, wherein the projected member is integral with the pipe.

6. The joint for piping according to claim 1, wherein the projected member is separate from the pipe and is provided on an external circumferential surface of the pipe using jointing means.

7. The joint for piping according to claim 6, wherein the separate projected member is a plate or a bar adhered to the external circumferential surface of the pipe.

8. The joint for piping according to claim 6, wherein the separate projected member is formed by projecting a part of an annular body, which is fit and fixed on the outside of the pipe, in a radial direction.

9. The joint for piping according to claim 6, wherein the separate projected member is provided by fixing a die with a projection to the pipe using a heat-shrinkable tube.

10. The joint for piping according to claim 1, wherein the projected member is on an annular body which is fit and fixed on the outside of the pipe.

11. The joint for piping according to claim 1, wherein the projected member is formed on a separate annular body and projects in a radial direction from a part of the annular body, which is fixed by pressing the annular body on a rectangular spool formed on the pipe.

12. A joint for piping comprising:

a pipe with an annular swelling wall near an end thereof; and a connector body with sealing members for sealed engagement with portions of the pipe between the annular swelling wall and the end; and a socket body including plural engagement sections facing outward in a radial direction and engaging the connector body, and plural locking pieces facing inward in the radial direction for engaging a side of the annular swelling wall opposite the sealing members, wherein rotation preventing means is provided for preventing rotation between the pipe and the connector body, the rotation preventing means includes at least one projection separate from the pipe, the projection being provided on an external surface of the pipe using jointing means and being on a side of the annular swelling wall of the pipe opposite the sealing members and engaged with the locking pieces of the socket body, the projection being formed by projecting a part of an annular body, which is fit an fixed on the outside of the pipe in the radial direction.

13. A joint for piping comprising:

a pipe with an annular swelling wall near an end thereof; and a connector body with sealing members for sealed engagement with portions of the pipe between the annular swelling wall and the end; and a socket body including plural engagement sections facing outward in a radial direction and engaging the connector body, and plural locking pieces facing inward in the radial direction for engaging a side of the annular swelling wall opposite the sealing members, wherein rotation preventing means is provided for preventing rotation between the pipe and the connector body, the rotation preventing means includes at least one projection provided on a side of the annular swelling wall of the pipe opposite the sealing members and engaged with the locking pieces of the socket body, the projection being separate from the pipe, and wherein the separate projection is provided by fixing a die with a projection to the pipe using a heat-shrinkable tube.

14. A joint for piping comprising:

a pipe with an annular swelling wall near an end thereof; and a connector body with sealing members for sealed engagement with portions of the pipe between the annular swelling wall and the end; and a socket body including plural engagement sections facing outward in a radial direction and engaging the connector body, and plural locking pieces facing inward in the radial direction for engaging a side of the annular swelling wall opposite the sealing members, wherein rotation preventing means is provided for preventing rotation between the pipe and the connector body, the rotation preventing means includes at least one projection separate from the pipe and provided on a side of the annular swelling wall of the pipe opposite the sealing members and engaged with the locking pieces of the socket body, wherein the separate projection is formed in a recessed portion in an annular body which is fit and fixed on the outside of the pipe.

15. A joint for piping comprising:

a pipe with an annular swelling wall near an end thereof; and a connector body with sealing members for sealed engagement with portions of the pipe between the annular swelling wall and the end and a socket body including plural engagement sections facing outward in a radial direction and engaging the connector body, and plural locking pieces facing inward in the radial direction for engaging a side of the annular swelling wall opposite the sealing members, wherein rotation preventing means is provided for preventing rotation between the pipe and the connector body, the rotation preventing means includes at least one projection provided on a side of the annular swelling wall of the pipe opposite the sealing members and engaged with the locking pieces of the socket body, and wherein the projection is projected in the radial direction on a part of an annular body, which is fit and fixed on the outside of the pipe, and is fixed by pressing the annular body with a projection in a rectangular spool formed in the pipe.

* * * * *